United States Patent [19]
Jones et al.

[11] Patent Number: 5,318,878
[45] Date of Patent: Jun. 7, 1994

[54] CROSS-LINKED CONDUCTIVE POLYMERS AND ANTISTAT LAYERS EMPLOYING THE SAME

[75] Inventors: Raymond T. Jones, Webster; Charles C. Anderson, Rochester, both of N.Y.

[73] Assignee: Eastman Kodak Company, Rochester, N.Y.

[21] Appl. No.: 18,583

[22] Filed: Feb. 17, 1993

Related U.S. Application Data

[62] Division of Ser. No. 793,891, Nov. 18, 1991, Pat. No. 5,198,499, which is a division of Ser. No. 527,414, May 23, 1990, Pat. No. 5,096,975.

[51] Int. Cl.$^5$ .............................................. G03C 1/492
[52] U.S. Cl. ..................................... 430/271; 430/18; 430/270; 430/273; 430/523; 430/527
[58] Field of Search ................ 430/271, 18, 270, 273, 430/523, 527

[56] References Cited

U.S. PATENT DOCUMENTS

| | | | |
|---|---|---|---|
| 3,651,003 | 3/1972 | Bechtold | 525/375 |
| 3,826,788 | 7/1974 | Froelich | 525/375 |
| 4,225,665 | 9/1980 | Schadt, III | 430/529 |
| 4,415,697 | 11/1983 | Peng | 525/212 |
| 4,668,748 | 5/1987 | Hardam et al. | 526/240 |
| 4,960,687 | 10/1990 | Cho | 430/523 |

Primary Examiner—Marion E. McCamish
Assistant Examiner—Mark A. Chapman
Attorney, Agent, or Firm—Robert A. Gerlach

[57] ABSTRACT

Cross-linked conductive polymer, coating compositions and light sensitive elements containing at least one antistat layer where the cross-linked polymer is a copolymer of a vinylbenzene sufonic acid and an ethylenically unsaturated monomer containing at least one primary hydroxyl group cross-linked with a methoxyalkylmelamine.

12 Claims, No Drawings

CROSS-LINKED CONDUCTIVE POLYMERS AND ANTISTAT LAYERS EMPLOYING THE SAME

CROSS-REFERENCE TO RELATED APPLICATIONS

This application is a divisional application of U.S. application Ser. No. 07/793,891 filed Nov. 18, 1991 now U.S. Pat. No. 5,198,499 which is in turn a divisional application of U.S. application Ser. No. 07/527,414 filed May 23, 1990 and issued Mar. 17, 1992 as U.S. Pat. No. 5,096,975.

BACKGROUND OF THE INVENTION

1. Field of the Invention

This invention relates to cross-linked conductive polymers and more particularly to antistat layers employing the cross-linked conductive polymers. Additionally, the invention relates to light sensitive elements having at least one antistat layer.

2. Description of Related Art

Schadt, U.S. Pat. No. 4,225,665, discloses an antistatic composition for photographic films wherein a conductive polymer having carboxyl groups and a hydrophobic polymer containing carboxyl groups are cross-linked with a polyfunctional aziridine.

Hardam et al, U.S. Pat. No. 4,668,748, discloses a cross-linkable conductive copolymer of a monomer of sodium styrene sulfonate type and a vinyl amine monomer.

Because of the electrostatic charges that build up on polymeric articles as they move in contact with other surfaces of high dielectric constant, it has been necessary to provide a conductive layer on polymeric articles in order to prevent the build up of charges. This problem is particularly acute in photographic applications, both during the preparation thereof and during use and development, because during the preparation it is undesirable to have static discharge that will expose localized areas of the light sensitive recording media. Subsequently, both during the exposure cycle and the development cycle, static charges are unwanted because they attract dirt and dust particles which appear as imperfections in the final presentation of the developed image, whether it be in the form of a print or projected image. The two patents mentioned above, provide antistatic properties during the preparation and subsequently during processing of the film and are for that reason defined as having permanent antistat properties.

It is also desirable to provide antistat coatings for light sensitive elements wherein the antistat layers also serve as subbing layers for subsequently applied layers in the recording element, overcoat layer and the like. When employed as subbing layers, in addition to having antistat properties, the layers should also promote adhesion. When serving as an overcoat, the layer should also provide the recording element a measure of protection with regard to abrasion. Abrasion is an ever present problem in photographic films, particularly because in all stages of its preparation, use and development, the film encounters other objects such as rollers and the like. Indeed in motion picture film, for example, the film is constantly moved passed a variety of elements in the projection apparatus which can cause imperfections as a result of contact therewith. Further, as the film is utilized in projection apparatus, it attracts dust particles from the environment which when projected become enlarged. It is desirable to remove such particles and therefore it is necessary that the film have a measure of abrasion resistance in order to withstand brushing or the like to accomplish this purpose.

It is therefore desirable to provide an antistat layer in a photographic element that not only is of the proper conductivity to prevent the build up of electrostatic charges but also one which also enhances its function as a subbing layer to promote adhesion or as an overcoat to withstand the various forces applied to the surface of the particular photographic element.

SUMMARY OF THE INVENTION

The invention is directed to cross-linked conductive polymers to coating compositions thereof and to light sensitive elements containing at least one antistat layer of a copolymer of (1) an ammonium or alkali metal salt of a vinyl benzene sulfonic acid and (2) an ethylenically unsaturated monomer containing at least one primary hydroxyl group cross-linked with a methoxyalkylmelamine. The invention also contemplates coatings of such cross-linked polymers particularly coatings employed as antistatic layers in light-sensitive recording elements such as photographic films wherein the coatings are utilized as overcoats, subbing and backing layers to reduce fog caused by static discharges during manufacturing, customer use and the like.

DETAILED DESCRIPTION OF THE INVENTION

The invention thus contemplates conductive cross-linked polymers containing a water soluble electrically conductive addition polymer having functionally attached hydroxyl groups and being a copolymer of an alkali metal or ammonium salt of a vinyl benzene sulfonic acid and an ethylenically unsaturated monomer containing at least one primary hydroxyl group where this conductive polymer is cross-linked by reaction with a multi-functional methoxyalkylmelamine. By "multi-functional" is meant a methoxyalkylmelamine having at least two methoxy groups and preferably those having 3 or more methoxy groups. Hexamethoxyalkylmelamines are most preferred. Optionally, and preferably, the invention contemplates cross-linked polymers wherein in addition to the conductive addition polymer and the melamine cross-linking agent, the composition includes a hydroxyl containing latex binder polymer which provides resiliency to the antistat layers.

Thus, the invention contemplates not only the cross-linked polymers prepared utilizing the components indicated above, but also contemplates aqueous solutions or dispersions of the conductive addition polymer, an hydroxyl containing binder polymer which is water soluble or water dispersible and a methoxyalkylmelamine cross-linking agent.

In the preparation of the water soluble electrically conductive addition polymers having functionally attached hydroxyl groups, any suitable ammonium or alkali metal salt of a vinyl benzene sulfonic acid may be used such as, for example, sodium styrene sulfonate, ammonium styrene sulfonate, potassium styrene sulfonate, lithium styrene sulfonate, vinyl monoalkyl substituted benzene sulfonates, such as, for example, the ammonium, sodium, potassium or lithium salts of the following: vinyl toluene sulfonic acid, vinyl ethylbenzene sulfonic acid, vinyl n-propylbenzene sulfonic acid, vinyl isopropylbenzene sulfonic acid, vinyl n-butyl benzene sulfonic acid, vinyl tert-butyl benzene sulfonic acid, vinyl isobutyl benzene sulfonic acid, vinyl isopentyl benzene sulfonic acid, vinyl 3-methylbutyl benzene sulfonic acid, vinyl n-hexyl benzene sulfonic acid, vinyl isohexyl benzene sulfonic acid and the like. It is preferred that the alkyl group of the substituted vinylbenzene sulfonate have from 1–6 carbon atoms.

In the preparation of the water soluble electrically conductive polymer, any suitable compound containing an ethylenically unsaturated double bond capable of forming an addition polymer with the vinyl benzene sulfonate compound and containing at least one primary hydroxyl group may be employed such as for example, hydroxy ethylmethacrylate, hydroxy ethylacrylate, hydroxy n-propylmethacrylate, hydroxy n-butylacrylate, hydroxy containing acrylamides such as, N-methylol acrylamide, N-ethanol acrylamide dihydroxyethylmaleate, vinylbenzyl alcohol and the like. The benzene sulfonate and the ethylenically unsaturated hydroxyl containing compound are employed in ratios varying from 95:5 to 15:85. Preferably the hydroxyl containing compound should be present in at least 25 mole percent and most preferably from about 25 to about 50 mole percent. It is necessary that sufficient hydroxyl groups be present on the addition polymer in order to achieve the desired level of cross-linking when reacted with the methoxyalkylmelamine. Thus, when ethylenically unsaturated compounds containing more than a single hydroxyl group are employed, the molar amount of ethylenically unsaturated compound containing hydroxyl groups may be lowered. Further, it is also necessary that this copolymer contain sufficient sulfonate groups to provide the cross-linked polymer with sufficient conductivity for the specific application for which the conductive polymer is to be used. Thus, it may be necessary to modify the quantities of the two ingredients of the copolymer to achieve the proper balance of cross-link sites and salt groups.

When a binder polymer is to be employed in the preparation of the conductive polymers in accordance with this invention, any suitable hydroxyl containing solution or latex polymer may be employed such as for example, polyvinyl alcohol, polyhydroxy ethylacrylate, polyhydroxyethylmethacrylate, polyhydroxypropylacrylate or methacrylate, polyhydroxyethylcellulose, polyhdroxylpropylcellulose, N-methylol acrylamide gelatin, polyhydroxyl ethyl acrylamide, water soluble cellulose acetate and the like. The presence of a hydroxyl containing binder polymer is preferred as the antistat layers are less brittle. It is further preferred that the binder polymer be employed in an amount of from about 20 to about 50 percent by weight of the coating composition to achieve abrasion resistance and permanancy of the antistatic properties.

As cross-linking agents, any suitable methoxyalkylmelamine may be employed such as for example, those multifunctional methoxyalkylmelamines having at least 2 and preferably 3 to 6 methoxyalkyl groups, such as hexamethoxymethylmelamine, trimethoxymethylmelamine, hexamethoxyethylmelamine, tetramethoxyethylmelamine, hexamethoxypropylmelamine, pentamethoxy-propylmelamine, trimethoxybutylmelamine and the like. The cross-linking agent should be employed in an amount of from about 20 percent to about 75 percent by weight depending upon the degree of cross-linking desired in the final coated layer. The cross-linking agent is preferably used in an amount of from about 25 to about 50 percent by weight. It is preferred that hexamethoxymethylmelamine be employed.

In the preparation of coating compositions for application to any type of support to which antistatic properties are to be imparted, the conductive polymer, the cross-linking agent and the binder polymer, if one is to be employed, is dissolved or suspended in an aqueous medium. Surfactants may also be added to facilitate solution or dispersion or as a coating aid. Suitable surfactants include sodium lauryl sulfonate, dioctyl sodium sulfosuccinate, sodium octylphenylpolyether sulfonate, saponin and the like.

The coating compositions, in accordance with the above, may be applied in any suitable location with respect to the type of photographic film desired. The antistatic coatings in accordance with this invention are suitable for all types of light sensitive recording elements including commercial photographic film, graphic arts films, x-ray films, microfilm, electrophotographic elements and the like. Any suitable photographic support may be employed such as for example, polyethylene-terephthalate; cellulose esters including cellulose diacetate, cellulose triacetate, paper, resin coated paper, polycarbonate and the like. The coating compositions may be applied directly to one surface of the support or it may be applied to the surface of any other layer of the photographic element. It may be desirable prior to applying the coating the composition to subject the underlying surface to corona discharge treatment in accordance with techniques known in the art. The antistatic layer may be applied either above or beneath a photosensitive layer such as a gelatin layer containing silver halide or the like. Subbing layers suitable for promoting adhesion of the various layers may be employed in accordance with the common knowledge known in the art especially that taught in U.S. Pat. Nos. 2,678,235; 2,627,088; 2,703,290; 2,794,742; 2,852,378 and 2,943,937.

The compositions in accordance with this invention may be applied in any suitable coverage based on the dry weight of the composition and preferably in a coverage of from about 5 to about 200 milligrams per square foot depending upon the type of layer being applied. For a subbing layer the coverage preferably should be about 5 to 50 milligrams per square foot; for a backing layer from about 25 to about 200 milligrams per square foot. Subsequent to application in the given location with respect to the structure of the light sensitive recording element, the antistat layer is subjected to drying and curing which transforms the aqueous coating composition into a permanent antistat layer which is a highly abrasion resistant, water resistant transparent layer. In the curing of the antistat layer, temperatures of from about 25° C. to about 200° C. may be employed. Preferably a temperature from about 80° C. to 140° for approximately 3 to 10 minutes are employed.

The conductive cross-linked polymer coatings in accordance with this invention provide extremely good protection against the occurrence of electrostatic charges on the film in addition to providing abrasion resistant coatings: thereby serving the dual purpose of an antistat coating and a protective overcoat.

The invention will be further illustrated by the following examples:

EXAMPLE 1

Preparation of Conductive Polymer

A solution of 10 grams of sodium styrene sulfonate, 10 grams of hydroxyethylmethacrylate and 0.1 gram sodium persulfate and 180 grams of distilled water is placed in a flask equipped with a condenser. The solution is sparged with nitrogen for 30 minutes and then heated in an oil bath maintained at 90° C. for 20 hours. The solution is cooled to room temperature to yield approximately 99% conversion to a copolymer with a molar ratio of 4:6 sodium styrene sulfonate to hydroxyethylmethacrylate.

EXAMPLE 2

Preparation of Coatings

The composition prepared in Example 1 is diluted to a 2% solids solution in water. Seventy grams of this solution are mixed with 30 grams of a 2% solids solution in water of a terpolymer of n-butylacrylate/acrylic acid/hydroxyethylmethacrylate (70/10/15), 20 grams of a 2% by weight solution in ethanol of hexamethoxymethylmelamine and 1 gram of a 10% by weight aqueous solution of a surfactant sold under the trade designation Olin 10G. This formulation is coated with a doctor blade onto a polyethylene terephthalate film base previously coated with an adhesion promoting coating of poly(acrylonitrile-vinylidene chloride-acrylic acid) latex. The sample is dried for 5 minutes at 100° C. to give an antistatic layer with a dry weight of 50 milligrams per square foot. This antistat coating exhibits a surface resistivity, measured as log ohm/per sq, at 30% relative humidity after immersion in 95° F water for 0 minutes, 0.5 minutes, 1 minute, 3 minutes and 5 minutes as 9.1, 9.1, 9.2, 9.1 and 9.1, respectively.

EXAMPLE 3

The procedure of Example 2 is repeated. The antistat layer thus applied is overcoated with a bis(vinyl sulfonyl methane)—hardened gelatin layer applied in a coverage of 200 milligrams per square foot. This sample is tested for adhesion of the gelatin layer and for permanence of the antistatic properties after treatment in typical film developer and fixer. Dry adhesion is checked by scribing ⅛ inch by ⅛ inch square hatch marks in the coating with a razor blade, placing a piece of high tack tape over the scribed area and then quickly pulling the tape from the surface. The amount of area removed is the measure of dry adhesion. No discernible area is removed.

Wet adhesion is tested by placing the sample in developer and fixer at 95° F. for 30 seconds each and then rinsing the sample in distilled water. While still wet, a one millimeter wide line is scribed in the gelatin layer and finger rubbed vigorously across the scribe line. No increase in line width is observed thereby showing excellent adhesion to a gelatin layer.

A second sample prepared as above is also treated for 30 seconds each in developer and fixer maintained at 95° F., rinsed in distilled water, air dried and equilibrated at 20% RH. The internal resistivity is measured as 12.5 log ohm per square.

It should be understood that any of the hydroxyl containing binder polymers enumerated above, any of the methoxyalkylmelamines and any conductive polymer as indicated may be employed throughout the working examples set forth above in like quantities to achieve comparable results without departing from the spirit of this invention.

What is claimed is:

1. In an image recording element having a support base layer, a light-sensitive layer and an antistat layer, the improvement which comprises employing as the antistat layer a cross-linked conductive polymer comprising the reaction product of a water-soluble electrically conductive polymer having functionally attached hydroxyl groups, said water-soluble electrically conductive polymer containing from about 25 to about 50 mol of hydroxyl containing moieties and being an addition product for (1) an ammonium or alkali metal salt of a vinylbenzene sulfonic acid and (2) an ethylenically unsaturated monomer containing at least one primary hydroxyl group and a methoxyalkylmelamine.

2. The image recording element of claim 1 wherein the vinylbenzene sulfonic acid is styrene sulfonic acid.

3. The image recording element of claim 1 wherein the methoxyalkylmelamine is present in an amount of from about 20 to about 75 percent by weight.

4. The image recording element of claim 1 wherein the methoxyalkylmelamine is present in an amount of from about 20 to about 75 percent by weight.

5. The image recording element of claim 1 wherein the methoxyalkylmelamine has from 3 to 6 methoxy groups.

6. The image recording element of claim 1 wherein the methoxyalkylmelamine is an hexamethoxyalkylmelamine.

7. In an image recording element having a support base layer, a light-sensitive layer and an antistat layer, the improvement which comprises employing as the antistat layer a cross-linked conductive polymer comprising the reaction product of a water-soluble electrically conductive polymer having functionally attached hydroxyl groups and being an addition product of (1) an ammonium or alkali metal salt of a vinylbenzene sulfonic acid and (2) an ethylenically unsaturated monomer containing at least one primary hydroxyl group and a methoxyalkylmelamine and from about 20 to about 50 percent by weight of an hydroxyl containing binder polymer.

8. The image recording element of claim 7 wherein the vinylbenzene sulfonic acid is styrene sulfonic acid.

9. The image recording element of claim 7 wherein the methoxyalkylmelamine is present in an amount of from about 20 to about 75 percent by weight.

10. The image recording element of claim 7 wherein the methoxyalkylmelamine is present in an amount of from about 20 to about 75 percent in weight.

11. The image recording element of claim 7 wherein the methoxyalkylmelamine has from 3 to 6 methoxy groups.

12. The image recording element of claim 7 wherein the methoxyalkylmelamine is an hexamethoxyalkylmelamine.

* * * * *